US006221519B1

(12) United States Patent
Doi et al.

(10) Patent No.: US 6,221,519 B1
(45) Date of Patent: Apr. 24, 2001

(54) MAGNETIC RECORDING MEDIUM AND PROCESS FOR PRODUCING THE SAME

(75) Inventors: Takanori Doi, Hatsukaichi; Kousaku Tamari; Yasuo Kakihara, both of Hiroshima; Kenichi Nakata, Otake; Mitsuru Matsuura; Setsuo Yamamoto, both of Ube, all of (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

(21) Appl. No.: 09/272,622

(22) Filed: Mar. 19, 1999

(30) Foreign Application Priority Data

Mar. 20, 1998 (JP) .................................................. 10-092520

(51) Int. Cl.$^7$ ............................... G11B 5/66; G11B 5/70; B05D 5/12; H05H 1/24; C23C 14/32
(52) U.S. Cl. ..................................... 428/694 TS; 428/900; 427/128; 427/130; 427/576; 204/192.2
(58) Field of Search ................ 204/192.2; 427/128–130, 427/576; 428/694 T, 694 TS, 65.3, 900

(56) References Cited

U.S. PATENT DOCUMENTS 5,601,904 * 2/1997 Tamari et al. ........................ 428/212
5,736,235 * 4/1998 Matsuda et al. ..................... 428/212

FOREIGN PATENT DOCUMENTS

| 0 586 142 A1 | 3/1994 | (EP) . |
| 0 600 697 A1 | 6/1994 | (EP) . |
| 0 673 021 A1 | 9/1995 | (EP) . |
| 0907162 * | 7/1999 | (EP) . |

* cited by examiner

Primary Examiner—D. S. Nakarani
Assistant Examiner—Holly C. Rickman
(74) Attorney, Agent, or Firm—Nixon & Vanderhye

(57) ABSTRACT

A magnetic recording medium comprising:
  a plastic substrate;
  a nickel oxide underlayer formed on said substrate; and
  a cobalt-containing maghemite thin film formed on said nickel oxide underlayer, containing cobalt at a molar ratio of cobalt to iron of 0.01:1 to 0.1:1, and having either a spacing of a plane (311) of not more than 2.510 Å, a spacing of a plane (222) of not more than 2.415 Å or a spacing of a plane (220) of not more than 2.950 Å,
a ratio value of an X-ray diffraction pattern peak intensity of either of the planes (311), (222) and (220) of said cobalt-containing maghemite thin film to an X-ray diffraction pattern peak intensity of the plane (400) thereof being more than 0.5. Such magnetic recording medium suitably applicable to existent magnetic recording systems using a ring-type magnetic head and capable of using a plastic substrate for providing a magnetic recording medium for high-density recording.

7 Claims, 1 Drawing Sheet

X : 1μm/div

MAGNETIC RECORDING MEDIUM AND PROCESS FOR PRODUCING THE SAME

BACKGROUND OF THE INVENTION

The present invention relates to a magnetic recording medium and a process for producing the magnetic recording medium, and more particularly, to a magnetic recording medium suitably applicable to existent magnetic recording systems using a ring-type magnetic head and capable of using a plastic substrate for providing a magnetic recording medium for high-density recording. Still more particularly, the present invention relates to a magnetic recording medium having an excellent stability independent of change in passage of time, a higher coercive force and a higher saturation magnetization, exhibiting a lower noise and a large output in a high frequency range, and being free from the distortion in reproduction waveform, and a process for producing such a magnetic recording medium in industrially and economically advantageous manner.

In recent years, in magnetic recording apparatuses such as a hard disc drive, there has been a remarkable tendency that information devices or systems used therefor are miniaturized and required to have a high reliability. In association with such a recent tendency, in order to deal with a large capacity data, there has been an increasing demand for providing magnetic recording media on which information can be stored with a high density.

In order to fulfill such requirements, the magnetic recording media have been strongly required to have an excellent stability independent of change in passage of time and a coercive force as high as possible and a saturation magnetization as high as possible.

As magnetic recording media having a high coercive force and a high saturation magnetization, there have been widely known those comprising a substrate and a magnetic thin film formed on the substrate.

The magnetic thin films which have been already put into practice, are generally classified into oxide thin films composed of maghemite, etc. (refer to "Technical Report of Electronic Telecommunication Institute", published by Electronic Telecommunication Institute, (1981) MR81-20, pp. 5 to 12), and alloy thin films composed of Co-Cr alloy or the like.

The magnetic oxide thin films composed of maghemite are excellent in oxidation resistance or corrosion resistance because maghemite is iron oxide. Therefore, the magnetic oxide thin films composed of maghemite can show an excellent stability independent of change in passage of time, and less change in magnetic properties with passage of time. However, the coercive force of the magnetic oxide thin films composed of maghemite is as low as at most about 700 Oe, and the saturation magnetization thereof is as low as at most 240 emu/cm$^3$.

Whereas, the alloy thin films have a coercive force as high as not less than about 2,000 Oe, and a saturation magnetization as high as about 300 emu/cm$^3$. However, metal materials themselves in the alloy thin films tend to be readily oxidized, so that the stability independent of change in passage of time is deteriorated.

In order to prevent magnetic properties of these alloy thin films from being deteriorated due to the oxidation, the surfaces of the alloy thin films have been coated with a protective film, e.g., a carbon film having usually a thickness of about 100 to about 200 Å. However, in such a case, a whole thickness of the resultant magnetic recording medium becomes increased by the thickness of the carbon film, the loss due to the magnetic spacing (distance between a magnetic head and a magnetic recording layer) becomes large, resulting in incompetence of which disables the magnetic recording medium to be applied to high-density recording.

In consequence, it has been attempted to enhance the coercive force and saturation magnetization of the above-mentioned magnetic oxide thin films composed of maghemite which are excellent in oxidation resistance, corrosion resistance and stability independent of change in passage of time, by incorporating cobalt or the like into the maghemite thin film. The maghemite thin films containing cobalt, etc., have been already put into practice (Japanese Patent Publications (KOKOKU) Nos. 51-4086(1976) and 5-63925(1993), "CERAMICS", published by Japan Ceramics Institute (1986), Vol. 24, No. 1, pp. 21–24, and the like). In addition, there have been extensively developed so-called perpendicular magnetic films which are capable of high-density recording because of free from demagnetization since these films are magnetized in the direction perpendicular to the surface thereof, and in which the plane (400), is predominantly oriented in the direction parallel with the surface of a substrate (Japanese Patent Publication (KOKOKU) No. 7-60768(1995) and Japanese Patent Application Laid-Open (KOKAI) No. 7-307022(1995)).

In the cobalt-containing maghemite thin films, the more the cobalt content, the higher the coercive force thereof becomes. However, with the increase in the cobalt content, the stability independent of change in passage of time of the magnetic maghemite thin films tend to be deteriorated by adverse influences of heat or the like.

In the case where information recorded on the above-mentioned perpendicular magnetic films is read out using an existent magnetic recording system equipped with a ring-type magnetic head which have been currently extensively used, there is caused the distortion of isolated reproduced waveform (i.e., an isolated reproduced pulse shape of so-called "di-pulse"). For this reason, it is necessary to conduct a specific signal processing.

In order to avoid conducting the specific signal processing, a single-pole magnetic head used in a perpendicular magnetic recording system may be used appropriately. However, the perpendicular magnetic recording system has not been extensively used yet and the single-pole magnetic head is still very expensive.

Thus, at the present time, there has been a strong demand for providing magnetic recording media for high-density recording which are suitable for use in current magnetic recording systems equipped with a ring-type magnetic head. For this reason, various kinds of magnetic recording media as mentioned above have been extensively developed. Among them, the magnetic oxide thin films composed of maghemite having excellent oxidation resistance and corrosion resistance have been considered to be most useful, so that it have been more strongly demanded to improve properties of these magnetic oxide thin films composed of maghemite.

That is, as described above, the cobalt-containing maghemite thin films have been strongly required not only to show a high coercive force and a high saturation magnetization, but also to exhibit a less noise and a large output in a high frequency region and to be free from the distortion of isolated reproduced waveform.

Meanwhile, the cobalt-containing maghemite film has been produced on a substrate by a sputtering method or the like. The production process generally requires a temperature as high as not less than about 300° C. As a result, there arises a problem that only aluminum discs, aluminum alloy discs or the like which can withstand a temperature as high as not less than 300° C., are usable in the process.

The conventional production processes in which the temperature as high as not less than 300° C. is required, have such a problem that it becomes difficult to produce the cobalt-containing maghemite film in industrially and economically useful manner.

As conventional methods for producing the cobalt-containing maghemite thin film, there are known (1) a method of sputtering an Fe-Co alloy target in a mixed gas atmosphere composed of argon and oxygen to form a cobalt-containing hematite thin film on a substrate, reducing the hematite thin film in a hydrogen atmosphere at a temperature as high as 230 to 320° C. so as to transform the hematite thin film into a cobalt-containing magnetite thin film, and then oxidizing the obtained cobalt-containing magnetite thin film at a temperature of 290 to 330° C.; (2) a method of sputtering sintered magnetite containing cobalt as a target to form a cobalt-containing magnetite thin film on a substrate, and then oxidizing the obtained cobalt-containing magnetite thin film at a temperature as high as not less than 320° C.; (3) a method of forming a cobalt-containing maghemite thin film directly on a substrate by decomposing a vapor of metal chelate, metal carbonyl or ferrocenes containing iron and $M_x$ (wherein M represents at least one element selected from the group consisting of Co, Cu, Rh, Ru, Os, Ti, V and Nb, and x is 0.01 to 0.1), and an oxygen gas in a pressure-reduced plasma which is highly-densified by applying a magnetic field thereto (Japanese Patent Application Laid-Open (KOKAI) No. 3-78114 (1991)); or the like.

At the present time, as magnetic recording media for high-density recording which are suitable for use in current magnetic recording systems using a ring-type magnetic head, there have been demanded magnetic recording media having an excellent stability independent of change in passage of time, a high coercive force and a high saturation magnetization, exhibiting a lower noise and a large output in a high frequency region, and being free from the distortion of isolated reproduced waveform, and further it has been demanded to produce these magnetic recording media in industrially and economically advantageous manner without limitation to materials for substrates thereof. However, there have not been provided yet such magnetic recording media satisfying all of the above-mentioned requirements.

The conventional Co-containing maghemite thin films are still unsatisfactory in magnetic properties, especially cannot exhibit a high coercive force. When it is attempted to obtain a high coercive force, especially not less than 2,000 Oe, it is necessary to incorporate a large amount of cobalt thereinto. However, in such a case, the Co-containing maghemite thin film tends to be deteriorated in magnetic properties with passage of time by adverse influences of heat or the like.

Further, the cobalt-containing maghemite thin films have a problem that the output in a high frequency region is not larger for high-density recording.

As described above, the conventional perpendicular magnetic films composed of cobalt-containing maghemite have a problem concerning distortion of isolated reproduced waveform. Therefore, the perpendicular magnetic films cannot be applied to current magnetic recording systems using a ring-type magnetic head.

In the above-mentioned methods (1) and (2) of producing a cobalt-containing maghemite thin film, since these methods require a temperature as high as not less than 290° C., a material usable for the substrate is restricted. Therefore, these conventional methods are industrially and economically disadvantageous.

In the above-mentioned method (3) of producing a cobalt-containing maghemite thin film, since the maghemite thin film can be formed on a substrate maintained at a temperature as low as about 50° C., there can be used substrates composed of a plastic material having a low heat resistance, such as polyesters, polystyrene terephthalate, polyamides or the like. However, the coercive force value of the obtained magnetic recording media is about 1,700 Oe at most.

As a result of the present inventors' earnest studies, it has been found that by forming a nickel oxide underlayer on a plastic substrate by a reactive sputtering method; forming the cobalt-containing magnetite thin film on the nickel oxide underlayer by reactive sputtering a cobalt-containing iron alloy target at a substrate temperature of less than 240° C. in a mixed gas atmosphere containing oxygen and a rare gas; and oxidizing the obtained cobalt-containing magnetite thin film in a plasma-activated oxygen atmosphere containing a rare gas at a substrate temperature of less than 240° C., thereby converting the cobalt-containing magnetite thin film into a cobalt-containing maghemite thin film, a magnetic recording medium which is capable of having a high coercive force even when the cobalt content is as low as possible, exhibits an excellent stability independent of change in passage of time, a higher coercive force, a higher saturation magnetization even when the cobalt content is as low as possible, a lower noise and a large output in a high frequency region, and is free from the distortion of isolated reproduction waveform, can be produced in industrially and economically advantageous manner without limitation to a material for the substrate thereof. The present invention has been attained on the basis of the finding.

SUMMARY OF THE INVENTION

It is an object of the present invention to provide a magnetic recording medium which is provided with a cobalt-containing maghemite thin film capable of having an excellent stability independent of change in passage of time, a higher coercive force and a higher saturation magnetization even when the cobalt content is as low as possible, exhibiting a lower noise and a large output in a high frequency region, and being free from the distortion of isolated reproduction waveform, and which can be produced in industrially and economically advantageous manner without limitation to a material for the substrate thereof.

To accomplish the aims, in a first aspect of the present invention, there is provided a magnetic recording medium comprising:

a plastic substrate;

a nickel oxide underlayer formed on the substrate; and a cobalt-containing maghemite thin film formed on the nickel oxide underlayer, containing cobalt at a molar ratio of cobalt to iron of 0.01:1 to 0.1:1, and having either a spacing of a plane (311) of not more than 2.510 Å, a spacing of a plane (222) of not more than 2.415 Å or a spacing of a plane (220) of not more than 2.950 Å, a ratio value of an X-ray diffraction pattern peak intensity of either of the planes (311), (222) and (220) of said cobalt-containing maghemite thin film to an X-ray diffraction pattern peak intensity of the plane (400) thereof being more than 0.5.

In a second aspect of the present invention, there is provided a process for producing a magnetic recording medium, comprising:

forming a nickel oxide underlayer on a plastic substrate by a reactive sputtering method;

forming the cobalt-containing magnetite thin film on the nickel oxide underlayer by reactive sputtering a cobalt-containing iron alloy target at a substrate temperature of less than 240° C. in a mixed gas atmosphere containing oxygen and a rare gas; and oxidizing the obtained cobalt-containing magnetite thin film in a plasma-activated oxygen atmosphere containing a rare gas at a substrate temperature of less than 240° C., thereby converting the cobalt-containing magnetite thin film into a cobalt-containing maghemite thin film.

DETAILED DESCRIPTION OF THE INVENTION

Figure 1:
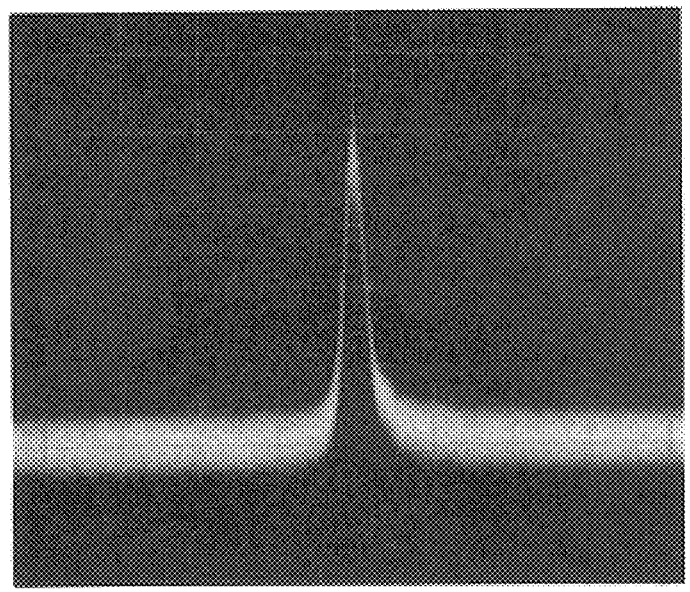
FIG. 1 shows an isolated reproduced waveform generated when a 1kFRPI signal is recorded on a magnetic recording medium obtained in Example 2.

First, the magnetic recording medium according to the present invention is described.

The magnetic recording medium according to the present invention comprises a plastic substrate, a nickel oxide underlayer formed on the substrate and a cobalt-containing maghemite thin film formed on the nickel oxide underlayer.

Examples of the resins may include so-called heat-resistant resins such as polyimides, polysulfones, polyarylates, polyphenylene sulfides (PPS), polyether ether ketones (PEEK), poly-p-vinyl phenol resins (PVP polymers), polyamides, polyethylene naphthalate (PEN), polyethylene terephthlate (PET), polyformaldehyde (e.g., "Delurin" produced by du Pont Corp.) polyethylene tetrafluoride, polyethylene trifluoride chloride, polystyrene, methacrylates, polycarbonates (PC) or the like. Meanwhile, the "thermal deformation temperature" means a temperature measured, for example, according to ASTM D-648.

The nickel oxide underlayer of the magnetic recording medium according to the present invention has a thickness of usually about 0.01 to about 0.5 $\mu$m, preferably 0.02 to 0.3 $\mu$m, more preferably 0.03 to 0.24 $\mu$m. When the thickness of the underlayer is less than 0.01 $\mu$m, it becomes difficult to obtain the aimed magnetic recording medium having a higher coercive force. On the other hand, when the thickness of the underlayer is more than 0.5 $\mu$m, the particle size of cobalt-containing maghemite particles contained in the magnetic thin film formed on the nickel oxide underlayer becomes large, so that the noise from the resultant magnetic recording medium tends to be increased.

It is preferred that the nickel oxide underlayer of the magnetic recording medium according to the present invention be less oriented in the plane (200) parallel with the surface of the substrate, more preferably not oriented at all in the plane (200). When the plane (200) is oriented to a large extent, there is caused a tendency that the plane (400) of the cobalt-containing maghemite thin film is grown and the di-pulse ratio is increased. Therefore, in the consideration of the di-pulse ratio, the ratio value of an X-ray diffraction peak intensity of plane (111) to that of plane (200) is preferably more than 0.5, more preferably not less than 1.0.

The cobalt-containing maghemite thin film has a thickness of usually 0.005 to 1.0 $\mu$m, preferably 0.006 to 0.5 $\mu$m, more preferably 0.007 to 0.3 $\mu$m. When the thickness of the cobalt-containing maghemite thin film is less than 0.005 $\mu$m, it is difficult to obtain a magnetic recording medium comprising a cobalt-containing maghemite thin film having a high coercive force. On the other hand, when the thickness of the cobalt-containing maghemite thin film is more than 1.0 $\mu$m, it is difficult to uniformly magnetize the obtained cobalt-containing maghemite thin film up to a deep portion thereof when signals are recorded thereon, thereby failing to obtain good recording and reproduction characteristics.

In the present invention, the maghemite is represented by the general formula of $\gamma$-$Fe_2O_3$, but may contain a slight amount of $Fe^{2+}$.

The cobalt content in the cobalt-containing maghemite thin film at a molar ratio of Co to Fe is usually 0.01:1 to 0.1:1, preferably 0.03:1 to 0.06:1. When the molar ratio is less than 0.01:1, it is difficult to obtain a magnetic recording medium having a high coercive force. On the other hand, when the molar ratio is more than 0.1:1, it is difficult to obtain a magnetic recording medium having an excellent stability independent of change in passage of time.

The cobalt-containing maghemite thin film may further contain at least one element selected from the group consisting of Mn, Ni, Cu, Ti and Zn in order to improve various properties thereof, in such an amount that the molar ratio of these elements to Fe is usually about 0.005:1 to about 0.04:1. Even in this case, the aimed effects of the present invention can be obtained similarly.

The cobalt-containing maghemite thin film according to the present invention has either a spacing of a plane (311) of not more than 2.510 Å, a spacing of a plane (222) of not more than 2.415 Å or a spacing of a plane (220) of not more than 2.95 Å.

In this case, if any one spacing condition is satisfied, it is not required to satisfy the other two spacing conditions.

When all of the above-mentioned three spacing conditions concerning the planes (311), (222) and (220) are not satisfied, it is not possible to obtain a magnetic recording medium having a high coercive force. Further, such a magnetic recording medium cannot exhibit a sufficiently large output in a high frequency region.

There is a close relationship between the spacing of the plane (311), the plane (222) or the plane (220) and the coercive force of the cobalt-containing maghemite thin film. In the case where the molar ratio of Co to Fe is the same, there is a tendency that the smaller the spacing, the higher the coercive force becomes.

The spacing of the plane (311) is usually not more than 2.510 Å, preferably not more than 2.509 Å, more preferably not more than 2.506 Å. The lower limit of the spacing of the plane (311) is preferably 2.490 Å.

The spacing of the plane (222) is usually not more than 2.415 Å, preferably not more than 2.400 Å, more preferably not more than 2.398 Å. The lower limit of the spacing of the plane (222) is preferably 2.385 Å.

The spacing of the plane (220) is usually not more than 2.950 Å, preferably not more than 2.943 Å, more preferably not more than 2.940 Å. The lower limit of the spacing of the plane (220) is preferably 2.920 Å. The cobalt-containing maghemite thin according to the present invention has the ratio value of an X-ray diffraction pattern peak intensity of either of the planes (311), (222) and (220) planes to that of the plane (400) of more than 0.5. When the ratio thereof is not less than 0.5, it is difficult to obtain the magnetic recording medium suitable for high-density recording in current magnetic recording systems using a ring-type magnetic head.

The magnetic recording medium according to the present invention, has a saturation magnetization (value of magnetization at an applied magnetic field of 15 kOe) of usually 250 to 400 emu/cm$^3$, preferably 300 to 360 emu/cm$^3$, and a coercive force (value of coercive force at an applied magnetic field of 15 kOe) of usually not less than 2,200 Oe, preferably not less than 2,400 Oe. In the present invention, especially when the molar ratio of Co to Fe is 0.04:1, such magnetic recording medium has a coercive force as high as about 6,900 Oe.

Incidentally, the upper limit of the coercive force of the magnetic recording medium according to the present invention, represents a value measured at an applied magnetic field of 15 kOe which is an upper limit value of the coercive force measurable by "vibration sample-type magnetometer VSM" described hereinafter.

In addition, the magnetic recording medium according to the present invention, exhibits a recording property ($S_{p-p}/N_{rms}$) of preferably not less than 45 dB, more preferably not less than 47 dB. Further, the recording density when the reproduced output is one half of a reproduced output obtained at a recording density of 1kFRPI (flux reversals per inch), is preferably not less than 130 kFRPI, more preferably not less than 140 kFRPI, and the di-pulse ratio thereof is 0.

Next, the process for producing the magnetic recording medium according to the present invention, is described.

The magnetic recording medium according to the present invention may be produced by forming a nickel oxide underlayer on a plastic substrate by a reactive sputtering method, and forming a cobalt-containing magnetite thin film deposited on the nickel oxide underlayer formed on the plastic substrate by a so-called sputtering method using Co-containing iron alloy as a target while introducing a mixed gas composed of oxygen and a rare gas, and controlling an oxygen flow rate (CCM) and a deposition speed (nm/min) of the cobalt-containing magnetite; and then oxidizing the obtained cobalt-containing magnetite thin film to transform the magnetite thin film into a cobalt-containing maghemite thin film.

In order to obtain the aimed magnetic recording medium according to the present invention, it is important to control the oxygen flow rate (CCM) in the mixed gas relative to the deposition speed (nm/min) of the cobalt-containing magnetite.

The oxygen flow rate (CCM) in the mixed gas relative to the deposition speed (nm/min) of the cobalt-containing magnetite, is varied depending upon various conditions for obtaining the cobalt-containing magnetite thin film oxidizing the Co-containing iron alloy target, for example, kind and structure of apparatus used, a total gas pressure, a substrate temperature, an area of the target to be sputtered or the like.

However, as a result of many experiments conducted, it has been recognized that there is a tendency that the less the oxygen flow rate (CCM) in the mixed gas relative to the deposition speed (nm/min) of the cobalt-containing magnetite, the smaller the spacing of each of the planes (311), (222) and (220) of the obtained cobalt-containing maghemite thin film becomes.

Accordingly, by conducting various experiments to obtain the oxygen flow rate (CCM) in the mixed gas relative to the deposition speed (nm/min) of the cobalt-containing magnetite at which the spacing of each of planes (311), (222) and (220) becomes smaller than that of the bulk, the deposition speed (nm/min) of the cobalt-containing magnetite and the oxygen flow rate can be respectively controlled so as to be smaller than that of the bulk.

In order to obtain such a cobalt-containing maghemite thin film having a smaller spacing of plane than that of bulk, in accordance with the experiments conducted, as described in Examples and Comparative Examples hereinafter, when the deposition speed of the cobalt-containing magnetite is 3.5 nm/min and a whole flow rate of the mixed gas is about 10 CCM, the oxygen flow rate is usually not more than 0.35 CCM, preferably not more than 0.27 CCM, more preferably not more than 0.25 CCM. The lower limit of the oxygen flow rate is usually 0.13 CCM. When the oxygen flow rate is more than 0.35 CCM, it is difficult to obtain such a cobalt-containing maghemite thin film that the spacing of either the plane (311), the plane (222) or the plane (220) is smaller than that of bulk. Further, hematite tends to be produced in the obtained cobalt-containing maghemite thin film, so that the saturation magnetization value thereof tends to be reduced. On the other hand, when the oxygen flow rate is less than 0.13 CCM, metal iron (Fe) or wustite (FeO) tends to be produced in the obtained cobalt-containing maghemite thin film, resulting in decrease in coercive force thereof.

As the rare gases used in the present invention, there may be exemplified helium, neon, argon, krypton, xenon, radon or the like. In the consideration of the sputtering rate and economy, argon is preferable among these rare gases.

The cobalt-containing magnetite may be deposited at a substrate temperature of usually less than 240° C. In the consideration of the heat-resistance of plastic materials used for the substrate, the deposition temperature is preferably not more than 200° C., more preferably not more than 180° C. The lower limit of the deposition temperature is preferably −196° C.

The time required for depositing the cobalt-containing magnetite may be represented by the value obtained by dividing the thickness of deposited film by the deposition speed.

The cobalt-containing magnetite thin film is then oxidized into a cobalt-containing maghemite thin film. At this time, it is important that the oxidation is conducted at a substrate temperature of less than 240° C. in a plasma-activated oxygen atmosphere containing a rare gas.

As the method of irradiating the plasma-activated oxygen ions, there may be exemplified a method using an ECR microplasma. In addition, the irradiation condition includes an ashing mode and an etching mode. In general, in the ashing mode, an ion beam emitted from a plasma-generating chamber is irradiated onto a substrate while maintaining the ionized state. Therefore, the ashing mode is suitably used for surface-modification treatments. On the other hand, in the etching mode, the ion beam emitted from the plasma-generating chamber neutralizes a space charge using a neutralizer, so that the intensity and amount of the ion beam are increased. Therefore, the etching mode is effective to conduct an etching treatment.

The ion acceleration voltage is preferably −500 to 0 V, more preferably −300 to −100 V. When the ion acceleration voltage is less than −500 V, the thin film may suffer from etching, so that the film thickness becomes decrease or uneven. When the ion acceleration voltage is more than 0 V, the plasma-activated oxygen ion is not irradiated because the electron is emitted. In the present invention, it has been recognized that under such a condition that the thin film remains unremoved, for example, the ion acceleration voltage of less than −500 V, a similar oxidation-accelerating effect can be obtained by any of the irradiation modes.

In order to increase the amount of plasma generated, it is important to incorporate a rare gas (such as He, Ne, Ar, Kr, Xe or Rn) into a process gas (oxygen) for the purpose of acceleration of the reaction. In the consideration of the effect of accelerating the oxidation of the cobalt-containing magnetite, helium and neon are preferable. As to the amount of the rare gas contained, the percentage of flow rate of the rare gas to that of oxygen is preferably 1 to 90%, more preferably 2 to 75%, still more preferably 3 to 60%. When the rare gas is contained in the above-specified range, the oxygen can be effectively excited.

When the percentage of the rare gas flow rate to the oxygen flow rate is less than 1%, it is difficult to effectively produce an activated oxygen. On the other hand, when the percentage of the rare gas flow rate to the oxygen flow rate is more than 90%, the amount of oxygen required for the oxidation of the cobalt-containing magnetite may be comparatively reduced, so that the oxidation reaction takes a long period of time. The oxidation temperature is less than 240° C. In the consideration of heat resistance of the plastic substrate and productivity, the oxidation temperature is preferably not more than 200° C., more preferably not more than 180° C. The lower limit of the oxidation temperature is preferably −196° C.

The important point of the present invention lies in such a fact that in the case where the cobalt-containing maghemite thin film formed on the nickel oxide underlayer formed on the substrate is adjusted so that either the spacing of plane (311) of not more than 2.510 Å, the spacing of plane (222) of not more than 2.415 Å or the spacing of plane (220) of not more than 2.950 Å can be satisfied, and preferably in addition thereto, the ratio value of an X-ray diffraction pattern peak intensity of either of the planes (311), (222) and (220) planes to that of the plane (400) is more than 0.5, the obtained magnetic recording medium has an excellent stability independent of change in passage of time, a higher coercive force and a higher saturation magnetization, can exhibit a lower noise and a large output in a high frequency region, and is free from the distortion of isolated reproduced waveform.

The reason why the magnetic recording medium having such excellent properties can be obtained, is considered as follows. That is, due to the fact that the aimed magnetic recording medium cannot be obtained in any of the cases where the cobalt-containing maghemite thin film satisfies the specified spacing and has the specified ratio value of an X-ray diffraction pattern peak intensity but has no nickel oxide underlayer; where the cobalt-containing maghemite thin film has the nickel oxide underlayer and the specified spacing of the cobalt-containing maghemite thin film is satisfied but the specified ratio between the peak intensities thereof is not satisfied; and where the cobalt-containing maghemite thin film has the nickel oxide underlayer and the specified ratio between the peak intensities is satisfied but the specified spacing is not satisfied, the technical advantages of the present invention have been attained by a synergistic effect based on the nickel oxide underlayer, the specified spacing and the specified ratio between the peak intensities in the cobalt-containing maghemite thin film.

As to the spacing of the respective planes of the cobalt-containing maghemite thin film according to the present invention, even though the same heating temperature is used to transform the cobalt-containing magnetite thin film into the cobalt-containing maghemite thin film, the spacing of each of the planes (311), (222) and (220) is changed by varying the oxygen flow rate upon production of the cobalt-containing magnetite thin film. Due to this fact, it can be recognized that the change of the spacing is not caused by the difference in thermal expansion coefficient between the substrate and the nickel oxide underlayer or the cobalt-containing maghemite thin film upon the heat treatment, but is caused by reduction in spacing of the cobalt-containing maghemite thin film itself.

The reason why the magnetic recording medium according to the present invention is free from the distortion of isolated reproduced waveform, is considered as follows. That is, since the cobalt-containing maghemite thin film has the specified ratio between the peak intensities, the vertical component of magnetization can be reduced by inclining <100> axis as magnetic easy axis of the cobalt-containing maghemite thin film from the vertical direction to such an angle between the vertical direction and the parallel direction to the film surface.

Also, the reason why the noise from the magnetic recording medium according to the present invention can be reduced, is considered as follows. That is, the distance between oxygen atoms of the nickel oxide underlayer is close to the distance between oxygen atoms of the cobalt-containing magnetite or cobalt-containing maghemite, thereby preventing the formation of an initial layer which undergoes non-uniformity in particle size and magnetic properties as observed when the cobalt-containing maghemite thin film is directly formed on an amorphous substrate.

The reason why the oxidation temperature can be reduced to the temperature as low as less than 240° C., is considered as follows. That is, since the cobalt-containing magnetite thin film of the present invention cannot be oxidized merely by heat-treating the film at a substrate temperature of less than 240° C. in an atmospheric air, as shown in Comparative Examples hereinafter, it is considered that the oxidation temperature can be reduced to less than 240° C. by irradiating a plasma-activated oxygen ions containing a rare gas onto the cobalt-containing magnetite thin film.

The magnetic recording medium according to the present invention can have a higher coercive force and a higher saturation magnetization, can exhibit a lower noise and a large output in a high frequency region, is free from the distortion of isolated waveform, and can be, therefore, suitably used as magnetic recording media for high-density recording in current magnetic recording systems using a ring-type magnetic head.

In addition, in the magnetic recording medium according to the present invention, since the heat-treating temperature used for oxidizing the cobalt-containing magnetite thin film into the cobalt-containing maghemite thin film, is as low as less than 240° C., raw materials for the substrate is not required to have a heat resistance, so that plastic materials can be used therefor, resulting in a good productivity and industrial and economical advantages.

EXAMPLES

The present invention is described in more detail by Examples and Comparative Examples, but the Examples are only illustrative and, therefore, not intended to limit the scope of the present invention.

(1) The oxidation of the cobalt-containing magnetite thin film into the cobalt-containing maghemite thin film was determined by observing change in surface resistivity of the thin film which is one of indices thereof.

That is, the surface resistivity of the cobalt-containing magnetite thin film was in the range of 0.001 to 0.5 MΩ, while the surface resistivity of the cobalt-containing maghemite thin film was raised from 1 to 100 MΩ and varied thereover. The surface resistivity was measured by an Insulation Tester DM-1527 (manufactured by Sanwa Denki Keiki Co., Ltd.) by setting the distance between two probes to 10 mm.

(2) The macnetostatic properties such as coercive force and saturation magnetization of the magnetic recording medium, are expressed by values measured by "Vibration Sample Magnetometer VSM" (manufactured by TOEI KOGYO CO., LTD.).

(3) The X-ray diffraction patterns of the thin films are measured by "X-Ray Diffractometer RAD-IIA" (manufactured by RIGAKU DENKI CO., LTD.).

The measuring conditions of the X-ray diffraction patterns are as follow:

lamp used: Fe; lamp voltage: 40 kV; lamp current: 25 mA; sampling width of goniometer: 0.010°; scanning speed: 1.000°/min; light-emitting (divergent) slit: 1°; scattering slit: 1°; light-receiving slit: 0.30 mm.

The region covering a diffraction angle (2θ) of 30.00° to 60.00° was measured under the above-mentioned conditions.

(4) The recording properties such as noise, reproduced output or di-pulse of the magnetic recording medium are evaluated as follows.

That is, after a magnetic film was formed on the substrate and then the surface of the magnetic film was coated with a perfluoropolyether-based lubricant "FOMBLIN Z DOL" (tradename: produced by AUSIMONT K. K.), an MIG head for VCR having a gap length of about 0.2 μm and a track width of 21 μm was run on the obtained magnetic recording medium while contacting therewith. The respective recording properties were evaluated by using "Recording and Reproduction Tester M-84V" (manufactured by FUJITSU AUTOMATION CO., LTD.).

Specifically, the noise value (Nrms) was analyzed by "Spectrum Analyzer TR4171" (manufactured by ADVANTEST CO., LTD.) at a velocity of 3.0 m/s.

The reproduced output (Sp-p) and di-pulse ratio were analyzed by "Oscilloscope VP5514A" (manufactured by PANASONIC CO., LTD.) at a velocity of 3.0 m/s.

Figure 2:
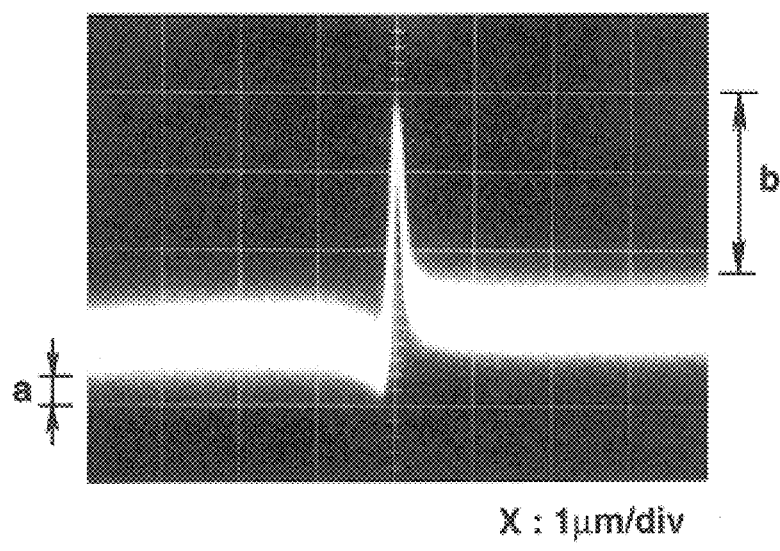
FIG. 2 shows an isolated reproduced waveform generated when a 1kFRPI signal is recorded on a magnetic recording medium obtained in Comparative Example 3.

The reproduced output is expressed, for example, by the sum of the values "a" and "b" as shown in FIG. 2, and the di-pulse ratio is expressed by the ratio of the value "a" to the value "b" as shown in FIG. 2.

Example 1

Using a high frequency sputtering apparatus SH-250H-T06 (manufactured by NIPPON VACUUM CO., LTD.), a metal (Ni) target was reaction-sputtered by adjusting a distance between a polyimide substrate and the target to 80 mm, at a substrate temperature of 180° C. in a mixed gas atmosphere composed of argon and oxygen at an oxygen flow rate of 0.18 CCM under an oxygen partial pressure of 0.15 mTorr and a total pressure of 9 mTorr, thereby depositing an NaCl-type NiO film having a thickness of 100 nm as an underlayer on the polyamide substrate at a deposition speed of 4.0 nm/min. As a result of the measurement of X-ray diffraction pattern thereof, the obtained NiO film showed a ratio value of a diffraction peak intensity of the plane (111) to that of the plane (200) of 1.

Further, a cobalt-containing iron alloy target (Fe containing Co of 4 wt. %) was sputtered on the obtained NiO film at a substrate temperature of 200° C. in a mixed gas atmosphere composed of argon and oxygen at an oxygen flow rate of 0.27 CCM under an oxygen partial pressure of 0.23 mTorr and a total pressure of 9 mTorr, thereby depositing a cobalt-containing magnetite thin film having a thickness of 20 nm and containing cobalt at a molar ratio of Co to Fe of 0.04:1, on the NiO film formed on the polyimide substrate at a deposition speed of 4.0 nm/min.

The obtained cobalt-containing magnetite thin film had a surface resistivity of 0.07 MΩ. Incidentally, the electric power applied was 300 W.

The obtained two-layered film composed of the NiO film and the cobalt-containing magnetite thin film was oxidized by irradiating with plasma-activated oxygen ions under a total gas pressure of $3 \times 10^{-4}$ Torr in an oxygen atmosphere containing helium (percentage of helium gas flow rate to oxygen flow rate: 50%) at a substrate temperature of 150° C., at a microwave power of 100 W, at an ion acceleration voltage of –150 V for 5 seconds by using an Electron Cyclotron Resonance (ECR)-type ion shower apparatus "EIS-200ER" (manufactured by ELIONIX CO., LTD.). The obtained thin film had a surface resistivity of 15 MΩ, and was, therefore, determined to be a cobalt-containing maghemite formed on the NiO underlayer.

As a result of the measurement of X-ray diffraction pattern of the obtained magnetic recording medium, diffraction peaks of the plane (311) having a spacing of 2.505 Å and the plane (220) having a spacing of 2.934 Å, were observed, but no diffraction peak of the plane (400) was observed.

The magnetostatic property of the magnetic recording medium was measured, so that it was determined that the coercive force thereof was 2,600 Oe and the saturation magnetization thereof was 355 emu/cm$^3$.

The recording properties of the obtained magnetic recording medium were measured, so that it was determined that the $S_{p\text{-}p}/N_{rms}$ obtained when a 100 kFRPI signal was recorded was 49 dB, and the half-voltage density $D_{50}$ (recording density when the reproduced output was one half of a reproduced output obtained at a recording density of 1 kFRPI) was 139 kFRPI.

In addition, the isolated reproduced waveform of the magnetic recording medium obtained a 1 kFRPI signal was recorded, was observed by the oscilloscope, so that it was determined that the waveform exhibited a unimodal pulse shape corresponding to a di-pulse ratio of 0, as shown in FIG. 1. The magnetic recording medium was a longitudinal recording medium.

Examples 2 to 5 and Comparative Examples 1 to 4

The same procedure defined in Example 1 was conducted except that formation or non-formation and orientation of the nickel oxide underlayer, kind of the plastic substrate, substrate temperature, oxygen flow rate and deposition speed upon production of the cobalt-containing magnetite thin film, and substrate temperature, kind of the rare gas, percentage of rare gas flow rate to oxygen flow rate and irradiation time upon oxidation of the magnetite thin film were varied, thereby obtaining magnetic recording media.

The production conditions and various properties are shown in Tables 1 and 2.

Incidentally, in Examples 4 and 5 and Comparative Examples 1 and 3, no diffraction peak was observed with respect to the (400) plane.

In addition, the isolated reproduced waveform of the cobalt-containing maghemite obtained in Comparative Example 3 when a 1 kFRPI signal was recorded, was observed by the oscilloscope, so that it was determined that the waveform exhibited a unimodal pulse shape corresponding to a di-pulse ratio of 0.2, as shown in FIG. 2.

Incidentally, in Comparative Example 4, the cobalt-containing magnetite thin film was treated in an atmospheric air instead of the plasma-activated oxygen atmosphere containing the rare gas. However, the cobalt-containing magnetite thin film was not oxidized and remained as magnetite even after the treatment.

TABLE 1

| Examples and Comparative Examples | Substrate used | Nickel oxide underlayer Substrate temperature (°C.) | Thickness (nm) | $I_{(111)}/I_{(200)}$ value |
|---|---|---|---|---|
| Example 2 | PC | 50 | 150 | 8 |
| Example 3 | PC | 50 | 100 | 1 |
| Example 4 | Polyamide | 50 | 100 | 1 |
| Example 5 | Polyimide | 80 | 100 | 1 |
| Comparative Example 1 | PC | 50 | 100 | 1 |
| Comparative Example 2 | Polyamide | 50 | 100 | 1 |
| Comparative Example 3 | PC | 50 | 100 | 0.03 |
| Comparative Example 4 | Polyimide | 80 | 150 | 1 |

| Examples and Comparative Examples | Production of cobalt-containing magnetite thin film Substrate temperature (°C.) | Oxygen flow rate (CCM) | Deposition speed (nm/min) |
|---|---|---|---|
| Example 2 | 80 | 0.23 | 3.5 |
| Example 3 | 80 | 0.205 | 3.1 |
| Example 4 | 50 | 0.315 | 3.0 |
| Example 5 | 200 | 0.15 | 4.5 |
| Comparative Example 1 | 80 | 0.36 | 3.3 |
| Comparative Example 2 | 50 | 0.315 | 3.0 |
| Comparative Example 3 | 80 | 0.23 | 4.0 |
| Comparative Example 4 | 200 | 0.21 | 4.0 |

| Examples and Comparative Examples | Cobalt-containing magnetite thin film Surface resistivity (MΩ) | Cobalt content (molar ratio of Co:Fe) |
|---|---|---|
| Example 2 | 0.05 | 0.04:1 |
| Example 3 | 0.06 | 0.04:1 |
| Example 4 | 0.10 | 0.03:1 |
| Example 5 | 0.20 | 0.04:1 |
| Comparative Example 1 | 0.007 | 0.04:1 |
| Comparative Example 2 | 0.09 | 0:1 |
| Comparative Example 3 | 0.12 | 0.04:1 |
| Comparative Example 4 | 0.12 | 0.04:1 |

| Examples and Comparative | Substrate temperature | Kind of | Oxidation treatment Percentage of rare gas flow rate to oxygen flow rate | Irradiation |

TABLE 1-continued

| Examples | (°C.) | rare gas | (%) | time |
|---|---|---|---|---|
| Example 2 | 130 | He | 50 | 30 min. |
| Example 3 | 130 | He | 50 | 30 min. |
| Example 4 | 180 | He | 30 | 1 min. |
| Example 5 | 200 | He | 40 | 5 sec. |
| Comparative Example 1 | 130 | He | 50 | 30 min. |
| Comparative Example 2 | 180 | He | 30 | 1 min. |
| Comparative Example 3 | 130 | He | 50 | 1 min. |
| Comparative Example 4 | 200 | — | 0 | 5 sec. |

TABLE 2

| Examples and Comparative Examples | Magnetic thin film Composition | Cobalt content (molar ratio of Co:Fe) | Thickness (nm) |
|---|---|---|---|
| Example 2 | cobalt-containing maghemite | 0.04:1 | 60 |
| Example 3 | cobalt-containing maghemite | 0.04:1 | 60 |
| Example 4 | cobalt-containing maghemite | 0.03:1 | 20 |
| Example 5 | cobalt-containing maghemite | 0.04:1 | 20 |
| Comparative Example 1 | cobalt-containing maghemite | 0.04:1 | 50 |
| Comparative Example 2 | cobalt-containing maghemite | 0:1 | 20 |
| Comparative Example 3 | cobalt-containing maghemite | 0.04:1 | 20 |
| Comparative Example 4 | cobalt-containing magnetite | 0.04:1 | 20 |

| Examples and Comparative Examples | Magnetic thin film Surface resistivity (MΩ) | Spacing Plane (311) (Å) | Plane (222) (Å) | Plane (220) (Å) |
|---|---|---|---|---|
| Example 2 | 8 | 2.506 | 2.400 | 2.934 |
| Example 3 | 9 | 2.504 | — | 2.933 |
| Example 4 | 14 | 2.510 | — | 2.938 |
| Example 5 | 8 | 2.503 | — | 2.932 |
| Comparative Example 1 | 7 | 2.530 | — | 2.973 |
| Comparative Example 2 | 14 | 2.509 | — | 2.935 |
| Comparative Example 3 | 9 | — | — | — |
| Comparative Example 4 | 0.04 | 2.530 | 2.418 | 2,965 |

| Examples and Comparative Examples | Magnetic thin film Peak intensity ratio $I_{(311)}/I_{(400)}$ value | $I_{(222)}/I_{(400)}$ value | $I_{(220)}/I_{(400)}$ value | Saturation magnetization (emu/cm$^3$) | Coercive force (Oe) |

TABLE 2-continued

| | | | | | |
|---|---|---|---|---|---|
| Example 2 | 4 | 3 | 2.5 | 310 | 2,910 |
| Example 3 | 1.5 | 0 | 1.1 | 305 | 3,550 |
| Example 4 | ∞ | 0 | ∞ | 280 | 2,210 |
| Example 5 | ∞ | — | ∞ | 252 | 6,900 |
| Comparative Example 1 | ∞ | — | ∞ | 345 | 950 |
| Comparative Example 2 | 1 | — | 6.5 | 285 | 460 |
| Comparative Example 3 | 0 | 0 | 0 | 345 | 2,650 |
| Comparative Example 4 | 1.4 | 1 | 1.5 | 358 | 670 |

| Examples and Comparative Examples | Magnetic thin film | | |
|---|---|---|---|
| | $S_{p-p}/N_{rms}$ (dB) | $D_{50}$ (kFRPI) | Di-pulse ratio |
| Example 2 | 50 | 140 | 0 |
| Example 3 | 49 | 151 | 0 |
| Example 4 | 48 | 136 | 0 |
| Example 5 | 51 | 160 | 0 |
| Comparative Example 1 | 42 | 110 | 0 |
| Comparative Example 2 | 38 | 100 | 0 |
| Comparative Example 3 | 48 | 155 | 0.20 |
| Comparative Example 4 | 50 | 98 | 0 |

What is claimed is:

1. A magnetic recording medium comprising:
   a plastic substrate;
   a nickel oxide underlayer formed on said substrate; and
   a cobalt-containing maghemite thin film formed on said nickel oxide underlayer, containing cobalt at a molar ratio of cobalt to iron of 0.01:1 to 0.1:1, and having either a spacing of a plane (311) of not more than 2.510 Å, a spacing of a plane (222) of not more than 2.415 Å or a spacing of a plane (220) of not more than 2.950 Å, a ratio value of an X-ray diffraction pattern peak intensity of either of the planes (311), (222) and (220) of said cobalt-containing maghemite thin film to an X-ray diffraction pattern peak intensity of the plane (400) thereof being more than 0.5.

2. A magnetic recording medium according to claim 1, wherein the molar ratio of cobalt to iron in said cobalt-containing maghemite thin film is 0.03:1 to 0.06:1.

3. A magnetic recording medium according to claim 1 in which the cobalt-containing maghemite thin film further contains at least one element selected from the group consisting of Mn, Ni, Cu, Ti and Zn in such an amount that the molar ratio of said element to iron is 0.005:1 to 0.04:1.

4. A magnetic recording medium according to claim 1, wherein the spacing of the plane (311) is 2.490 to 2.509 Å, the spacing of the plane (222) is 2.385 to 2.400 Å, and the spacing of the plane (220) is 2.920 to 2.943 Å.

5. A magnetic recording medium according to claim 1, which further has a recording property of not less than 45 dB, and a recording density when the reproduced output is one half of a reproduced output obtained at a recording density of 1kFRPI, of not less than 130 k FRPI.

6. A magnetic recording medium according to claim 1, wherein the ratio value of an X-ray diffraction peak intensity of the plane (111) of said nickel oxide underlayer to that of the plane (200) thereof is more than 0.5.

7. A process for producing a magnetic recording medium as set forth in claim 1, comiprising:
   forming a nickel oxide underlayer on the plastic substrate by a reactive sputtering method;
   forming the cobalt-containing magnetite thin film on the nickel oxide underlayer by reactive sputtering a cobalt-containing iron alloy target at a substrate temperature of less than 240° C. in a mixed gas atmosphere containing oxygen and a rare gas; and
   oxidizing the obtained cobalt-containing magnetite thin film in a plasma-activated oxygen atmosphere containing a rare gas at a substrate temperature of less than 240° C., thereby converting the cobalt-containing magnetite thin film into a cobalt-containing maghemite thin film.

* * * * *